United States Patent
Rugaard

(12) 
(10) Patent No.: US 6,370,379 B1
(45) Date of Patent: Apr. 9, 2002

(54) METHOD AND ARRANGEMENT FOR TRANSFERRING INFORMATION RELATED TO A MOBILE SUBSCRIBER WHICH IS MOVING WITHIN A CELLULAR TELECOMMUNICATION SYSTEM

(75) Inventor: Peer Rugaard, Dusseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/051,708

(22) PCT Filed: Oct. 16, 1996

(86) PCT No.: PCT/SE96/01313

§ 371 Date: Jun. 26, 1998

§ 102(e) Date: Jun. 26, 1998

(87) PCT Pub. No.: WO97/15162

PCT Pub. Date: Apr. 24, 1997

(30) Foreign Application Priority Data

Oct. 18, 1995 (SE) ................................ 9503649

(51) Int. Cl.[7] .............................. H04Q 7/20; H04Q 7/38
(52) U.S. Cl. ........................ 455/435; 455/432; 455/436; 455/438; 455/445
(58) Field of Search ................................ 455/432, 433, 455/435, 436, 437, 438, 439, 422, 445, 550, 560, 552, 517, 403, 440, 442, 443, 444, 410, 411

(56) References Cited

U.S. PATENT DOCUMENTS 5,467,381 A * 11/1995 Pelton et al. ................ 455/433
5,561,854 A * 10/1996 Antic et al. .................. 455/432
5,590,133 A * 12/1996 Billstrom et al. ............ 455/433
5,649,301 A * 7/1997 Yabusaki et al. ............ 455/433

FOREIGN PATENT DOCUMENTS

| EP | 605120 | 7/1994 |
| WO | 93/25051 | 12/1993 |
| WO | 95/28063 | 10/1995 |

\* cited by examiner

Primary Examiner—William Trost
Assistant Examiner—Keith Ferguson
(74) Attorney, Agent, or Firm—Burns, Doane, Swecker & Mathis, L.L.P.

(57) ABSTRACT

A method for transferring information related to a mobile subscriber (MS) moving within a cellular telecommunication system (PLMN). The system (PLMN) includes a first switching centre (MSC/VLR1) and a second switching centre (MSC/VLR2). Subscriber data (AUTD, PRD) related to the mobile is permanently stored in a home location register (HLR) in the system (PLMN) and temporarily stored in the first switching centre (MSC/VLR1) in whose location area (LA1) the mobile is present. When the mobile (MS) moves from the first location area (LA1) to a second location area (LA2), handled by the second switching centre (MSC/VLR2), the temporarily stored subscriber data (AUTD, PRD) is transferred (2, 3, 6, 7) from the first to the second mobile switching centre. Then the new location of the mobile subscriber (MS) is stored in the home location register (HLR).

9 Claims, 10 Drawing Sheets

METHOD AND ARRANGEMENT FOR TRANSFERRING INFORMATION RELATED TO A MOBILE SUBSCRIBER WHICH IS MOVING WITHIN A CELLULAR TELECOMMUNICATION SYSTEM

TECHNICAL FIELD

The present invention relates to a method for transferring of information related to a mobile subscriber which is moving within a cellular telecommunication system. The invention also relates to an arrangement for carrying out the method.

DESCRIPTION OF THE BACKGROUND ART

Updating of location information regarding a mobile subscriber which is moving within a cellular telecommunication system requires a variety of signalling. A cellular telecommunication system includes a home location register and a number of switching centres. Each switching centre controls a number of cells, a so called cell area. Subscriber data and location information related to the mobile is permanently stored in the home location register. The home location register is thereby able to direct an incoming call intended for the mobile subscriber to the correct location. When the mobile subscriber is present in a cell area which is controlled by a certain switching centre, subscriber data is temporarily stored adjacent to the switching centre at a visitor location register. Whenever the mobile subscriber moves between cell areas, the corresponding subscriber data follows, i.e. the data is downloaded from the home location register into the new visitor location register. The subscriber data is subsequently deleted in the previously visitor location register.

In present location updating procedures, the home location register acts as master while the switching centres/visitor location registers act as slaves. In case of a home location register failure, the total content of the home location register first have to be downloaded from a backup tape which stores relatively fresh traffic information. The information subsequently have to be downloaded from the home location register into the visitor location registers. In confined areas, e.g. capitals, with high voice or data traffic, signalling lines between the home location register and the visitor location registers are carrying a relatively low amount of signalling traffic. However, the total investment of the signalling lines between the home location register and the visitor location registers have to be dimensioned to be able to handle the updating of the visitor location registers in case of the rare situation of a home location register failure.

The European patent application EP 0 605 120 A1 provides means for cost reduction of signalling path's lengths in selected areas.

SUMMARY OF THE INVENTION

In existing location updating procedures the home location register acts as master while the visitor location registers act as slaves. A cost problem arises since the signalling lines between the home location register and the switching centres often are long and since long signalling lines serving relatively low traffic are costly. Furthermore, in case of home location register failure, traffic information will have to be downloaded from a backup tape into the home location register and subsequently into the visitor location registers. Another cost problem thereby arises since the signalling lines between the home location register and the visitor location registers will have to be dimensioned to be able to handle the downloading. The traffic information which is downloaded into the visitor location register after the home location register failure will furthermore be somewhat out of date.

The problem is solved in accordance with the invention by modifying the location updating procedure so that the home location register acts as slave instead of master. The reversed master/slave relationship will reduce the costly signalling over long signalling lines. In case of home location register failure, downloading from the home location register to the visitor location register will be superfluous since the visitor location registers act as masters and consequently already are aware of the current traffic situation. The loading will now take place from the visitor location registers into the home location register. Since traffic path's between the home location register and the visitor location registers will be unused shortly after the home location register failure, the loading can now take place over the traffic path's.

The present invention thus relates to a method and an arrangement for transferring of subscriber specific data when the visitor location registers act as masters during the location updating procedure. Subscriber data, e.g. authentication data and service profile data, is permanently stored in the home location register and the data is temporarily stored in a first visitor location register in who's cell area the mobile is present. When the mobile moves to a second visitor location register, the data is mainly transferred immediate from the first visitor location register to the second register, thereby in accordance with the invention reducing the involvement of the home location register significantly.

An object of the invention is to limit the number of necessary dedicated signalling path's over long distances. Another object of the present invention is to reduce the network investment costs.

Another object is to integrate the signalling path's into the larger traffic path's.

Yet another object of the invention is to secure that no calls are lost during the location update procedure.

An important advantage is the reduction of costly long signalling path's.

Another advantage afforded by the present invention is the reduction of network installation costs.

Another advantage is the simplification of the updating procedure in case of home location register failure. Another advantage of the invention is that the data in the visitor location registers after a home location failure still will be up to date.

Yet another advantage of the invention is the reduction of the signalling delay during the location update procedure.

BRIEF DESCRIPTION OF THE DRAWINGS

FIG. 4 is divided into two parts, namely FIG. 4a and FIG. 4b.

BEST MODES OF CARRYING OUT THE INVENTION

Figure 1:
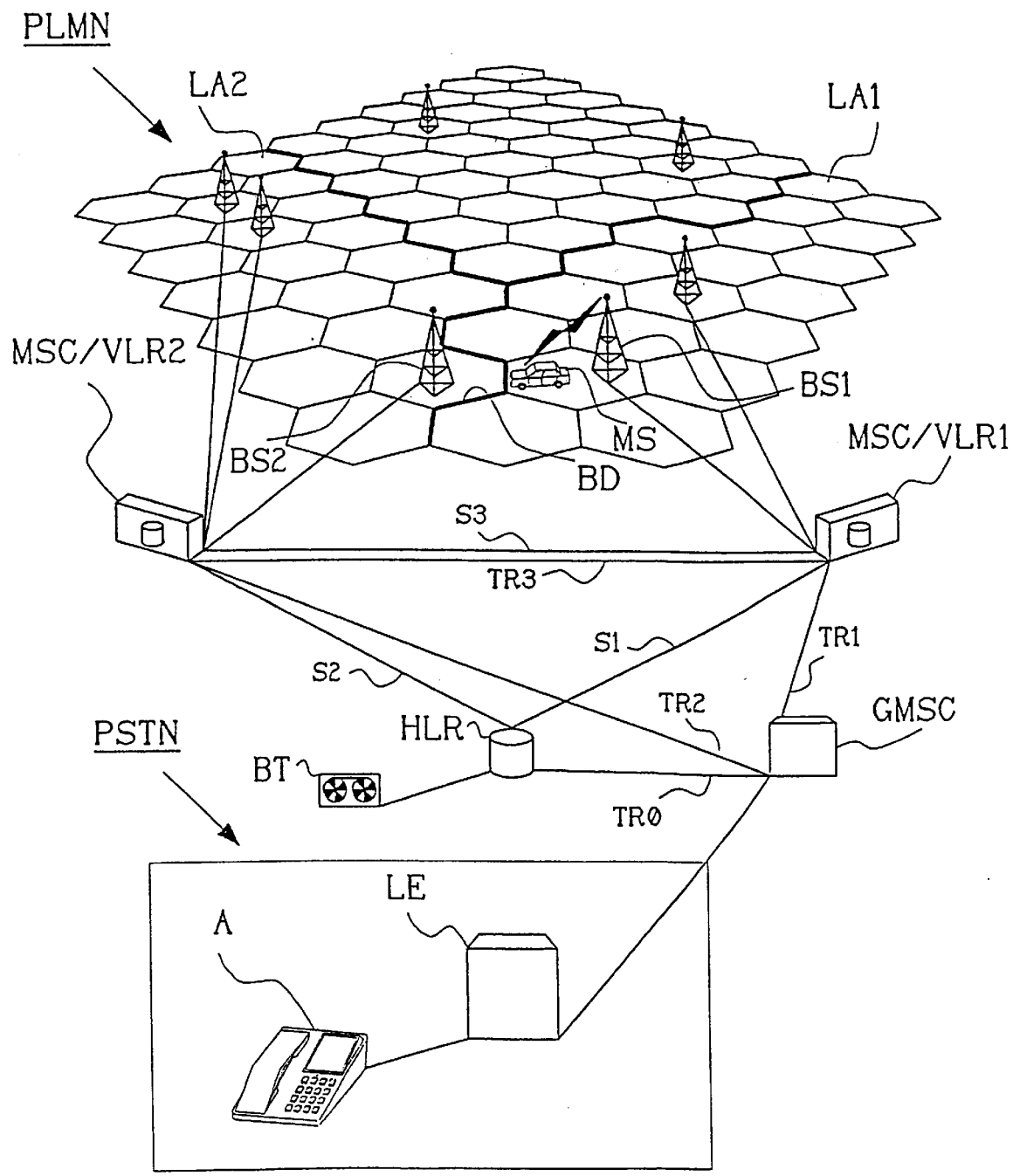
FIG. 1 is a perspective illustration of a telephone system comprising a public telephone network and a mobile network.

A mobile telecommunication system PLMN (Public Land Mobile Network) is shown in FIG. 1. The telecommunication system comprises a home location register HLR and mobile services switching centres MSC/VLR1, MSC/VLR2. The switching centres MSC/VLR1, MSC/VLR2 each comprises a visitor location register VLR1 and VLR2. In the following text the constellation of a visitor location register VLR in which mobiles are temporarily registered and a switching centre MSC which handles the distribution of traffic signals to the mobiles will be referred to as a mobile services switching centre MSC/VLR. The switching centres MSC/VLR1 and MSC/VLR2 distributes traffic and control information to base stations BS1, BS2 via transmission links. The traffic information could e.g. be speech information between two subscribers A and MS. The base stations BS1 and BS2 transmit and receive information to and from mobile subscribers by using radio signals. Only a few of the existing base stations BS1, BS2 are shown in the network PLMN in FIG. 1. FIG. 1 illustrates solely those units in a public land mobile network PLMN that are necessary to obtain an understanding of the invention. Numerous units included in a complete telecommunication system have been excluded from FIG. 1 as an attempt to make the figure more clear. The total radio covering area of one or more base stations controlled by one of the switching centres MSC/VLR1 or MSC/VLR2 is called a location area LA1, LA2. Normally adjacent radio covering areas are somewhat overlapping but for the purpose of easier understanding the invention, the location areas LA1, LA2 shown in FIG. 1 are separated from each other by lines of extra bold type. A gateway switch GMSC functions as an interface between the mobile telecommunication system PLAN and other types of network, e.g. a public network PSTN. The gateway switch GMSC is connected to the home location register HLR and to the two mobile services switching centres MSC/VLR1 and MSC/VLR2, via traffic trunks TR0, TR1 and TR2. The mobile services switching centres MSC/VLR1 and MSC/VLR2 are connected to each other via another traffic trunk, a so called third traffic trunk TR3. The mobile services switching centres MSC/VLR1 and MSC/VLR2 are also connected to each other and to a home location register HLR via signalling trunks S1, S2, S3. A backup tape device BT containing backup information from the home location register HLR is shown in FIG. 1. A public telephone network PSTN (Public Switched Telephone Network) connected to the mobile network is also shown in FIG. 1. The public network PSTN comprises a local exchange LE to which the telephone unit A is connected.

Figure 2:
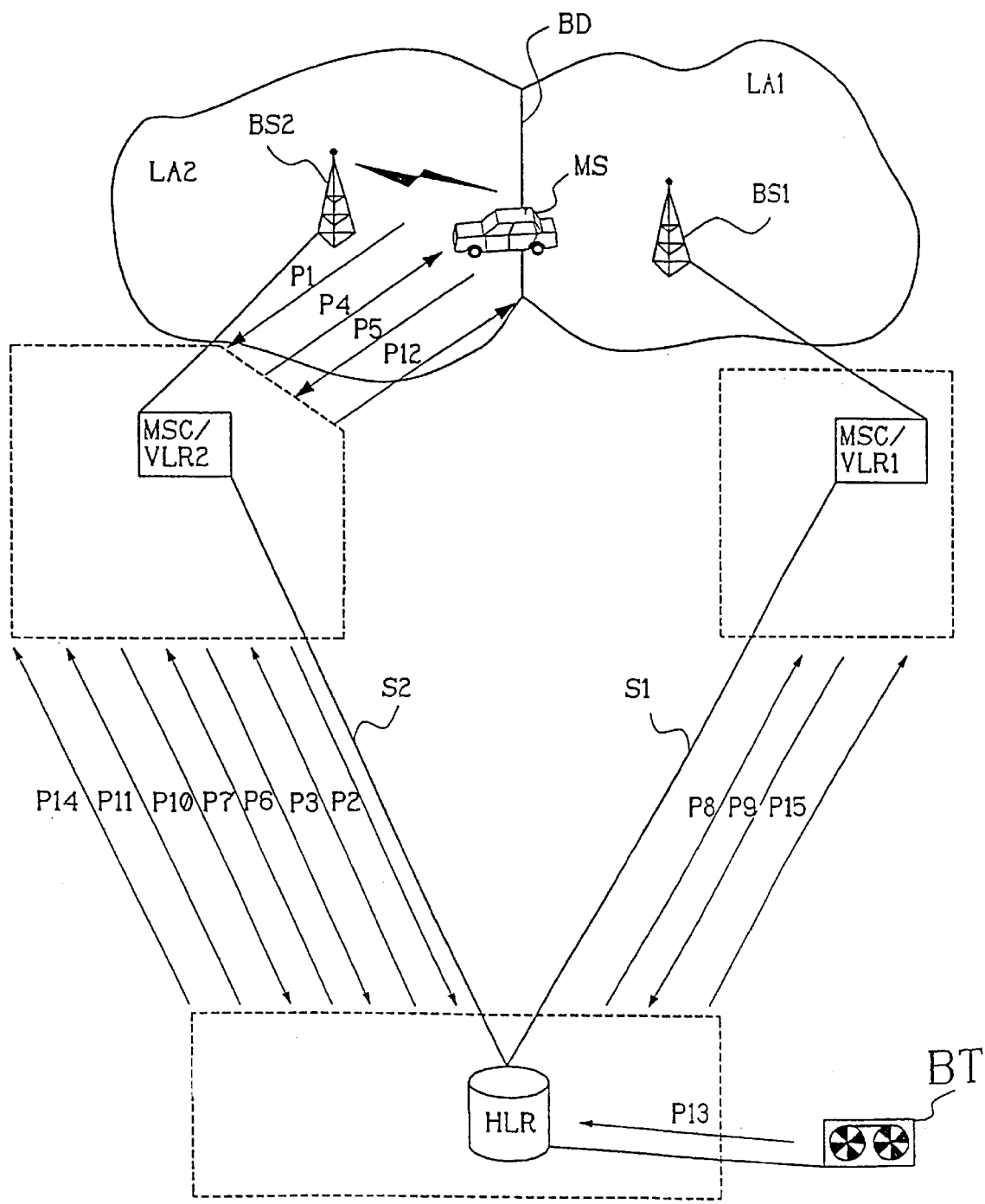
FIG. 2 is a block schematic diagram of a mobile network where a method of performing location updating according to prior art is illustrated. A loading method in accordance with prior art, after a home location failure, is also illustrated in the figure.

Some parts of the public land mobile network PLMN shown in FIG. 1 are also shown in FIG. 2. A location updating procedure in accordance pith prior art will in the following text be described. The two earlier mentioned location areas LA1 and LA2 are in the following text referred to as the first location area LA1 and the second location area LA2. Other signalling nodes like e.g. the earlier mentioned base stations BS1, BS2 and the mobile services switching centres MSC/VLR1, MSC/VLR2 are also mentioned together with one of the two prefix's "first" and "second". The first and second location areas LA1 and LA2 are symbolised as two areas LA1 and LA2 separated from each other by a border BD. Only the first base station BS1 is shown within the first location area LA1 even though radio covering area of several base stations together form the total radio covering area of the first location area LA1. In the same way, only the second base station is shown within the second location area LA2. The mobile subscriber MS is located in the border area of the two the two location areas LA1 and LA2. A radio connection is shown in the figure as a zig-zag symbol between the second base station BS2 and the mobile subscriber MS. The first base station BS1 is connected to the first mobile services switching centre MSC/VLR1 and the second base station BS2 is connected to the second switching centre MSC/VLR2. The switching centres are connected to the home location register HLR via the earlier mentioned signalling trunks S1 and S2, hereinafter called a first signalling trunk S1 and a second signalling trunk S2.

The mobile MS is permanently registered in the home location register HLR as a member of the mobile network, i.e. as having a subscription signed with the operator who controls the network PLMN. When the mobile subscriber is present within one of the location areas LA1, LA2, the mobile is temporarily registered in the switching centre that controls the location area. The method described in the following text comprises the relevant parts of the signalling which takes place during a location update procedure according to previous known technique. Messages will be represented in FIG. 2 by arrows showing the direction of the messages. The broken line symbols in FIG. 2 around some of the signalling nodes MCS/VLR1, MSC/VLR2, HLR are meant as a help for the reader to easier notice start and end points of the messages.

In an illustrated embodiment according to prior art, the mobile is first present in the first location area al and thereby temporarily registered in the first mobile services switching centre MSC/VLR1. As mentioned before, the mobile is also registered in the home location register HLR. The location update procedure according to previous known technique will now be shown. The method comprises the following steps:

Crossing, by the mobile subscriber MS, of a boundary BD between the first location area LA1 and the second location area LA2. The boundary BD is defined as the place where the signal strength from the second base station BS2 in relation to the signal strength from the first base station BS1 motivates a change of base stations for the mobile subscriber MS.

Sending of a location update request message P1, from the mobile subscriber MS to the second switching centre MSC/VLR2.

Sending of an authentication data request message P2, from the second switching centre MSC/VLR2 to the home location register HLR.

Sending of an authentication data response message P3 containing authentication data AUTD, from the home location register HLR to the second mobile services switching centre MSC/VLR2.

Storing of the authentication data AUTD in the second mobile services switching centre MSC/VLR2.

Sending of a triplet response message P4, from the second services switching centre MSC/VLR2 to the mobile subscriber MS.

Sending of a triplet confirm message P5, containing data required to authenticate the mobile subscriber MS, from mobile subscriber MS to the second switching centre MSC/VLR2.

Authorisation of the mobile subscriber MS as a visitor in the second switching centre MSC/VLR2.

Sending of a subscriber data request message P6, from the second switching centre MSC/VLR2 to the home location register HLR.

Sending of a subscriber data receive message P7 containing subscriber data PRD, from the home location register HLR to the second mobile services switching centre MSC/VLR2.

Sending of a remove visitor request message PS from the home location register HLR to the first switching centre MSC/VLR1.

Removing of the data AUTD, PRD in the first mobile services switching centre MSC/VLR1.

Sending of a remove visitor confirm message P9 from the first switching centre MSC/VLR1 to the home location register HLR.

Sending of a location information message P10 from the second mobile services switching centre MSC/VLR2 to the home location register HLR.

Storing in the home location register HLR of the new location of the mobile subscriber MS.

Sending of a location information confirm message P11 from the home location register HLR to the second mobile services switching centre MSC/VLR2.

Sending of a location update confirm message P12 from the second switching centre MSC/VLR2 to the mobile subscriber (MS).

In the prior art embodiment shown in FIG. 2, the mobile telecommunication system is situated in a large town, e.g. London and its suburbs. The two mobile services switching centres MSC/VLR1 and MSC/VLR2 are located inside London while the home location register is located centrally and handles a much larger area. The distance between the home location register HLR and the visitor location registers can easily be 5–7 times longer than the distance between the two switching centres MSC/VLR1, MSC/VLR2. As have been mentioned earlier, signalling over long distances is costly and as can be seen in FIG. 2 most of the signalling according to prior art, i.e. the messages P2, P3, P6, P7, P8, P9, P10 and P11, takes place over long distances.

The home location register HLR includes the earlier mentioned backup tape device BT which is shown in FIG. 2. A copy of the traffic information which is stored in the home location register HLR of that time is also stored on the backup tape. The traffic information comprises e.g. calls in progress or location information. In case the traffic information in the home location register is lost at a certain tire, the method in accordance with prior art will comprise the following further steps:

Downloading of the traffic information P13 stored on the backup tape device BT into the home location register HLR.

Storing of the downloaded traffic information in the home location register HLR.

Dividing of the stored traffic information into different parts, each part relating to one of the switching centres MSC/VLR1, MSC/VLR2.

Distributing of the different parts P14 and P15 of the stored information to the affected switching centres MSC/VLR1 and MSC/VLR2. The distribution takes place over the long signalling path's between the home location register HLR and the visitor location registers VLR.

A realistic time interval between the copying of traffic information from the home location register into the backup tape is approximately twenty minutes. During this time interval calls may have been set up and mobiles may have changed location. After the distribution into the home location register and subsequently into the visitor location registers, problem may arise due to the traffic information being out of date.

Figure 3:
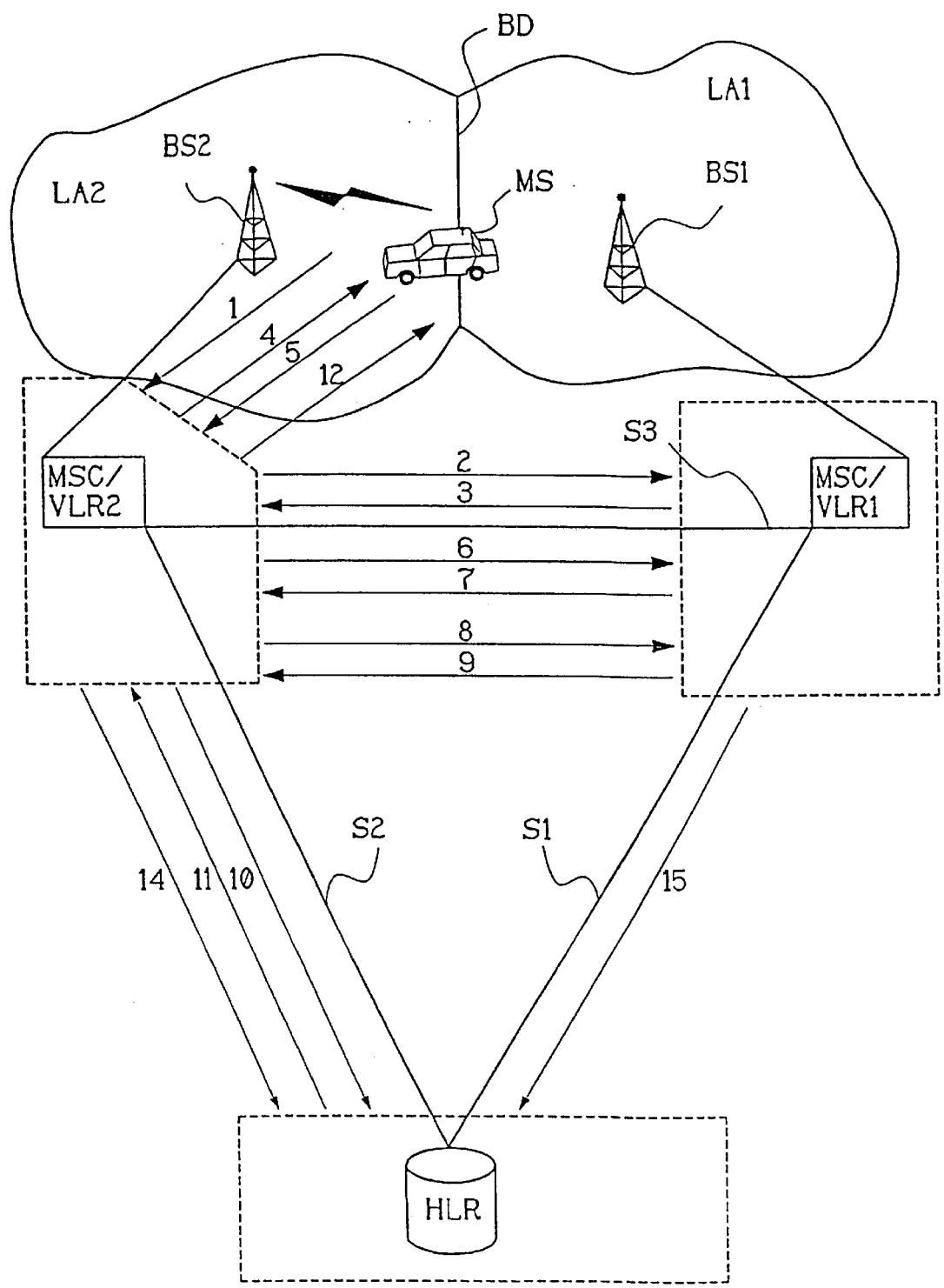
FIG. 3 is a block schematic diagram of a mobile network where a method of performing location updating according to the invention is illustrated. A loading method in accordance with the invention, after a home location failure, is also illustrated in the figure.

Some parts of the public land mobile network PLMN shown in FIG. 1 are also shown in FIG. 3. The first switching centre MSC/VLR1 and the second switching centre MSC/VLR2 are connected to each other via a third signalling trunk S3. A location updating procedure in accordance with the invention will in the following text be described.

The mobile subscriber MS is like in the prior art embodiment permanently registered in the home location register HLR as a member of the mobile network PLMN. When the mobile subscriber is present within one of the location areas LA1, LA2 it is temporarily registered in the switching centre that controls the location area. The mobile is also permanently registered in the home location register HLR. The method which in the following text will be described comprises the relevant parts of the signalling which takes place during a location update procedure according to the invention. Messages will be represented in FIG. 3 like in FIG. 2 by arrows showing the direction of the messages.

In an illustrated embodiment according to the invention, the mobile is present in the first location area LA1 and thereby temporarily registered in the first mobile services switching centre MSC/VLR1. The location update procedure according to the invention will now be shown. The method comprises the following steps:

Crossing, by the mobile subscriber MS, of the boundary BD between the first location area LA1 and the second location area LA2.

Sending of a location update request message 1, from the mobile subscriber MS to the second switching centre MSC/VLR2.

Sending of an authentication data request message 2, from the second switching centre MSC/VLR2 to the first switching centre MSC/VLR1.

Sending of an authentication data response message 3 containing authentication data AUTD, from the first mobile services switching centre MSC/VLR1 to the second mobile services switching centre MSC/VLR2.

Storing of the authentication data AUTD in the second mobile services switching centre MSC/VLR2.

Sending of a triplet request message 4, from the second services switching centre MSC/VLR2 to the mobile subscriber (MS).

Sending of a triplet response message 5, containing data required to authenticate the mobile subscriber MS from the mobile subscriber MS to the second switching centre MSC/VLR2.

Authorisation of the mobile subscriber MS as visitor in the second switching centre MSC/VLR2.

Sending of a subscriber data request message 6, from the second switching centre MSC/VLR2 to the first switching centre MSC/VLR1.

Sending of a subscriber data response message 7 containing subscriber data PRD, from the first mobile services switching centre MSC/VLR1 to the second mobile services switching centre MSC/VLR2.

Sending of a remove visitor request message 8 from the second switching centre MSC/VLR2 to the first switching centre MSC/VLR1.

Removing of the data AUTD, PRD in the first mobile services switching centre MSC/VLR1.

Sending of a remove visitor confirm message 9 from the first switching centre MSC/VLR1 to the second switching centre MSC/VLR2.

Sending of a location information message 10 from the second mobile services switching centre MSC/VLR2 to the home location register HLR.

Storing in the home location register HLR of the new location of the mobile subscriber MS.

Sending of a location information confirm message 11 from the home location register HLR to the second mobile services switching centre MSC/VLR2.

Sending of a location update confirm message 12 from the second switching centre (MSC/VLR2) to the mobile subscriber (MS).

It is to be understood that not all steps which right be necessary when performing a location updating procedure in accordance with prior art and in accordance with the invention are mentioned. Some steps which are of minor importance for the invention might have been excluded in an attempt to make the idea behind the invention more clear. Location updating procedures are however well known by those skilled in the art. The internal order of sequence for the different steps are also of minor importance and may vary without departing from the basic idea behind the invention.

Like in the earlier embodiment disclosed with reference to FIG. 2, the mobile telecommunication system in FIG. 3 is situated in a large town and its suburbs. As can be seen in FIG. 2 only a few messages 10 and 11 are now transferred over a long distance. Most of the messages 2, 3, 6, 7, 8 and 9 are transferred over a considerably shorter distance between the two switching centres MSC/VLR1 and MSC/VLR2. Like in the prior art embodiment, messages 1, 4, 5, 12 are of course transferred between the base station BS2 and the mobile subscriber MS. In the embodiment above the third signalling trunk S3 might be replaced with or integrated within the earlier mentioned third traffic trunk TR3. The most appropriate path may be set up whereby e.g. so called multidrop technique may be used. Multidrop technique is well known by a man skilled in the art.

In case the traffic information in the home location register is erased or distorted at a certain moment, the method in accordance with the invention will comprise the following further steps:

Loading of the traffic information 14 and 15 stored in the visitor location registers MSC/VLR1, MSC/VLR2 into the home location register HLR.

Storing of the downloaded traffic information in the home location register HLR.

The previous loading of traffic information from the backup tape into the home location register and the distribution of the traffic information into the switching centres MSC/VLR1, MSC/VLR2 will be superfluous in the method in accordance with the invention. The visitor location registers who are acting as masters are consequently already aware of the current traffic situation. Since the traffic path's between the home location register and the visitor location registers will be unused shortly after the home location register failure, the loading can now take place over the unused traffic path's. The costly dimensioning of the signalling path's between the home location register and the visitor location registers will thereby not be necessary.

Figure 4A:
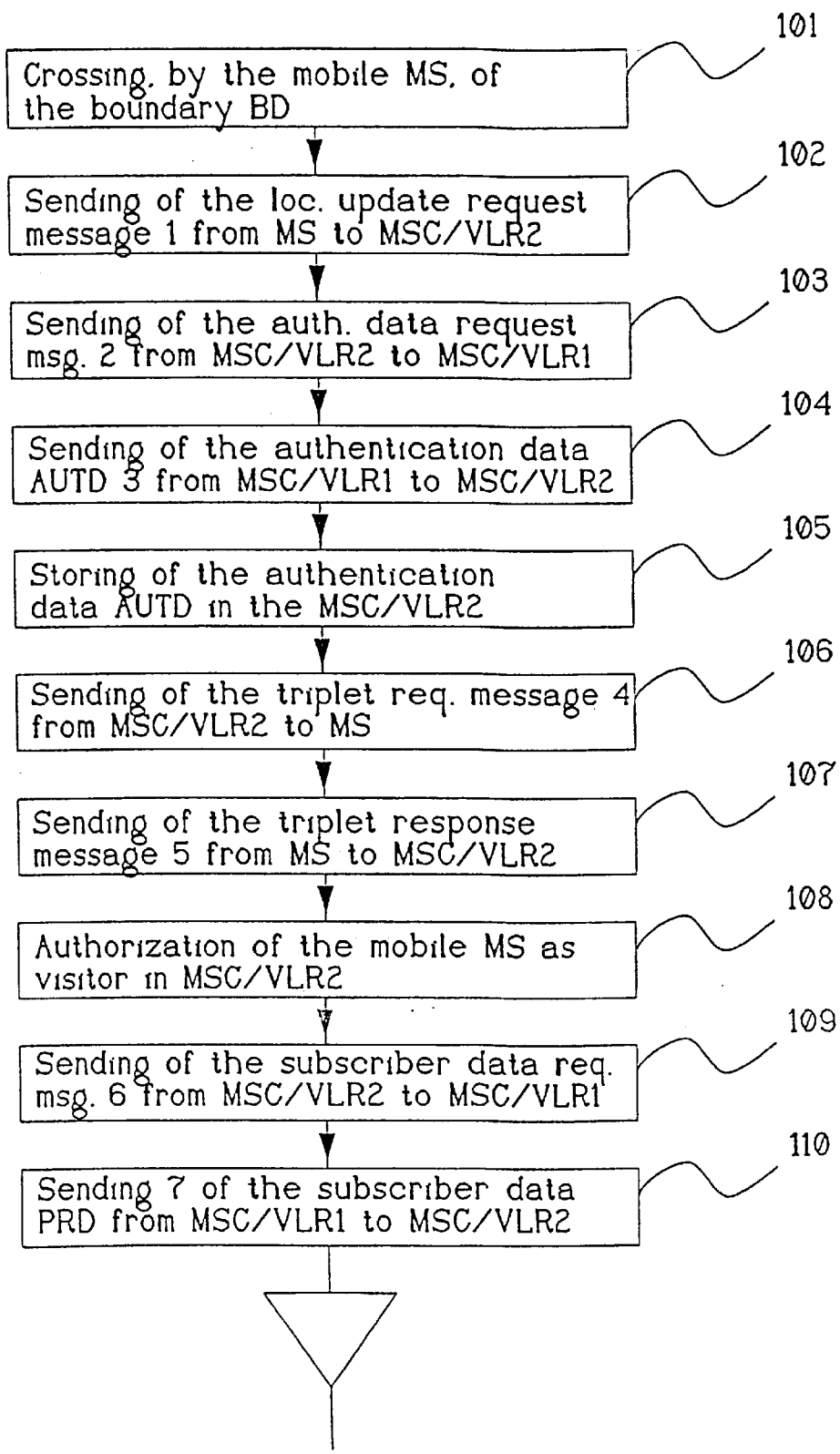
FIG. 4 is a flow sheet which illustrates the location updating and loading procedure in accordance with the invention.
Figure 4B:
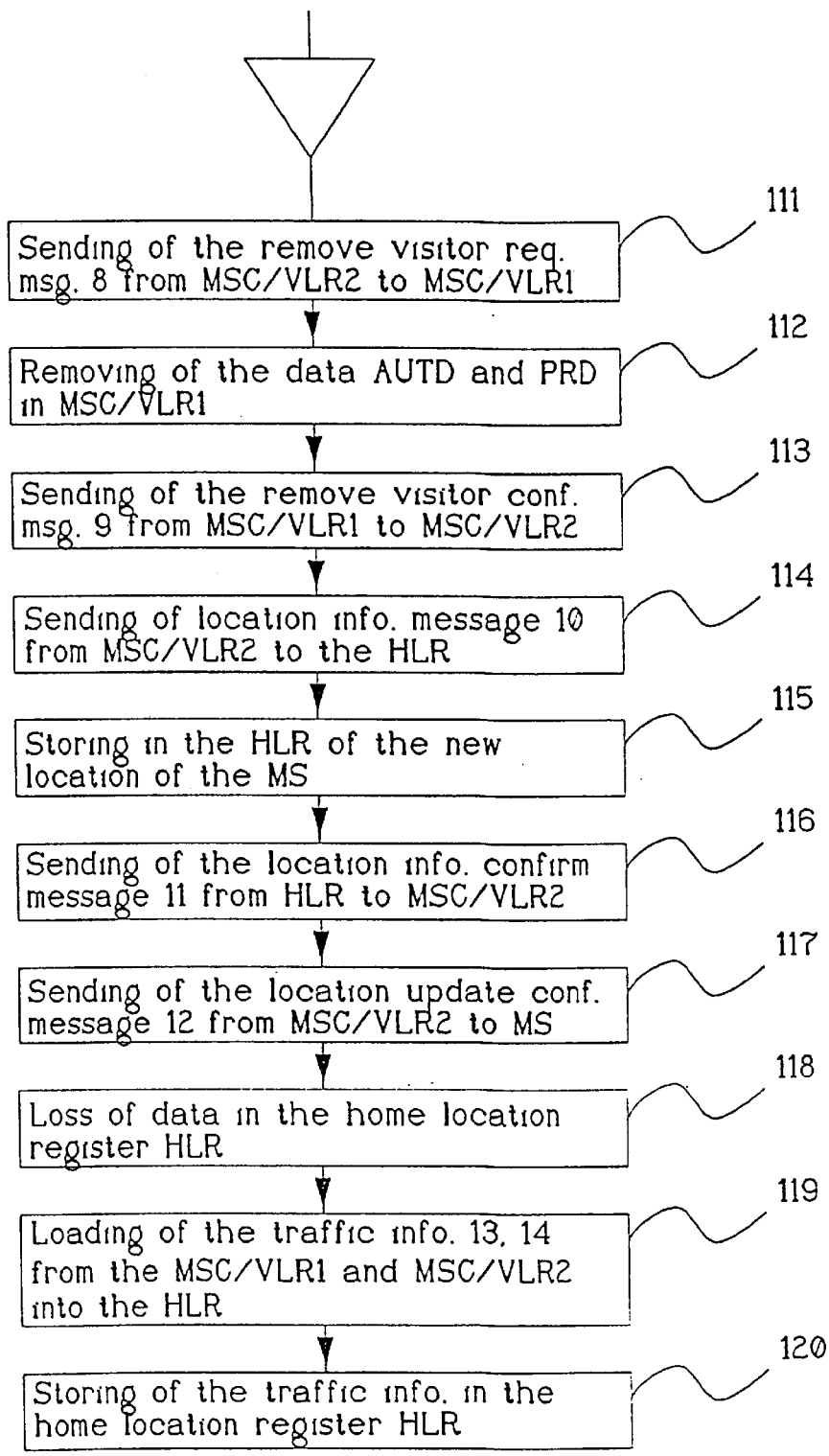

FIG. 4 is a flow sheet illustrating the location updating procedure and the downloading of traffic information after the home location failure. The flow sheet illustrates the steps that are most essential to the concept behind the invention. The abbreviations in the text in FIG. 4 have been explained in the foregoing. FIG. 4 is due to lack of space divided into two parts, FIG. 4a and FIG. 4b. The two illustrations together form the complete flow sheet and an unfilled large arrow put the two illustrations together. In the following text the two illustrations will be referred to as FIG. 4. The method is carried out in accordance with FIG. 4 and in accordance with the following steps:

Crossing, by the mobile subscriber MS, of the boundary BD between the first location area LA1 and the second location area LA2, in accordance with a block 101.

Sending of the location update request message 1, from the mobile subscriber MS to the second switching centre MSC/VLR2, in accordance with a block 102.

Sending of the authentication data request message 2, from the second switching centre MSC/VLR2 to the first switching centre MSC/VLR1, in accordance with a block 103.

Sending of the authentication data response message 3 containing authentication data AUTD, from the first mobile services switching centre MSC/VLR1 to the second mobile services switching centre MSC/VLR2, in accordance with a block 104.

Storing of the authentication data AUTD in the second mobile services switching centre MSC/VLR2, in accordance with a block 105.

Sending of the triplet request message 4, from the second services switching centre MSC/VLR2 to the mobile subscriber (MS), in accordance with a block 106.

Sending of the triplet response message 5, containing data required to authenticate the mobile subscriber MS, from the mobile subscriber MS to the second switching centre MSC/VLR2, in accordance with a block 107.

Authorisation of the mobile subscriber MS as visitor in the second switching centre MSC/VLR2, in accordance with a block 108.

Sending of the subscriber data request message 6, from the second switching centre MSC/VLR2 to the first switching centre MSC/VLR1, in accordance with a block 109.

Sending of the subscriber data response message 7 containing subscriber data PRD, from the first mobile services switching centre MSC/VLR1 to the second mobile services switching centre MSC/VLR2, in accordance with a block 110.

Sending of the remove visitor request message 8 from the second switching centre MSC/VLR2 to the first switching centre MSC/VLR1, in accordance with a block 111.

Removing of the data AUTD, PRD in the first mobile services switching centre MSC/VLR1, in accordance with a block 112.

Sending of the remove visitor confirm message 9 from the first switching centre MSC/VLR1 to the second switching centre MSC/VLR2, in accordance with a block 113.

Sending of the location information message 10 from the second mobile services switching centre MSC/VLR2 to the home location register HLR, in accordance with a block 114.

Storing in the home location register HLR of the new location of the mobile subscriber MS, in accordance with a block 115.

Sending of the location information confirm message 11 from the home location register HLR to the second mobile services switching centre MSC/VLR2, in accordance with a block 116.

Sending of the location update confirm message 12 from the second switching centre MSC/VLR2 to the mobile subscriber (MS), in accordance with a block 117.

The following steps which also are shown in FIG. 4 deal with the case of a home location register HLR, failure:

Home location register failure, in accordance with a block 118.

Loading of the current traffic information 14, 15 stored in the visitor location registers MSC/VLR1 and MSC/VLR2 into the home location register HLR, in accordance with a block 119.

Storing of the loaded traffic information in the home location register HLR, in accordance with a block 120.

Figure 5:
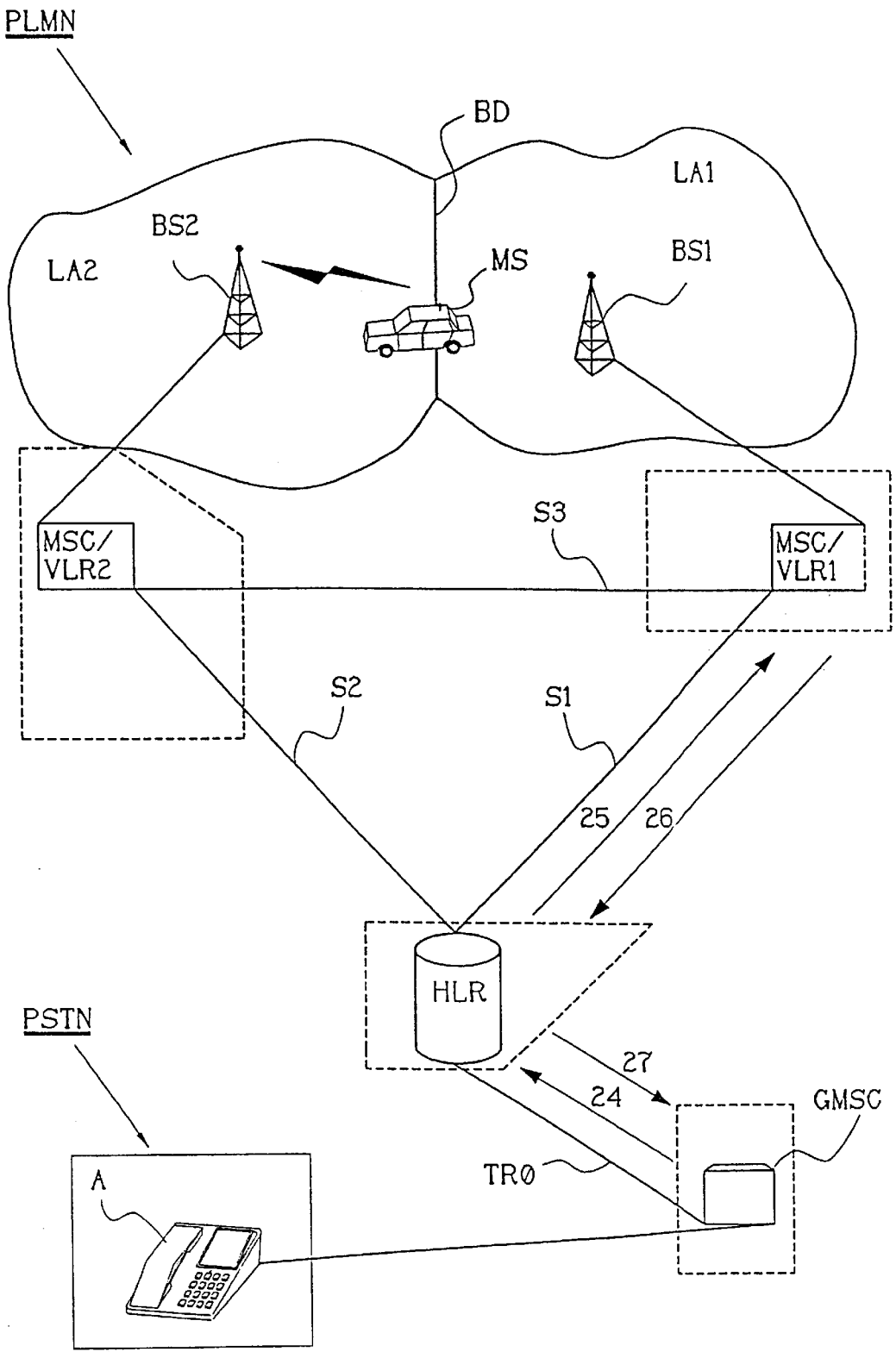
FIG. 5 is a block schematic diagram of a mobile network where a first method of call routing according to the invention is illustrated.

FIG. 5 shows the same public land mobile network PLMN as have been shown earlier in FIG. 3. A call set up procedure in accordance with the invention will in the following text be described. A gateway mobile services centre GMSC is connected to the home location register HLR via the traffic trunk TR0. The gateway centre GMSC functions as a meeting point which brings the mobile network PLMN and the public switching telephone network PSTN together. The public network PSTN is in FIG. 5 represented by the telephone A, associated with the gateway centre GMSC. The telephone will in the following text be referred to as the calling subscriber A. The method which now will be shown will illustrate the situation when an incoming call from the calling subscriber A arrives at the gateway centre GMSC before the earlier described location updating procedure has been finished. Since the involved switching centres MSC/VLR1 and MSC/VLR2 both are acting as masters while the home location register HLR acts as slave the method which later in the teat will be referred to might occur. According to the embodiment, the call arrives after the location updating procedure has started but before the home location register HLR has been notified of the new location of the mobile. In an illustrated embodiment, the call arrives to the gateway GMSC after the mobile subscriber MS has sent the location update request message 1 (see FIG. 3) to the second switching centre MSC/VLR2 but before the earlier mentioned information message 10 has been sent from the second switching centre MSC/VLR2 to the home location register HLR. A routing information request procedure according to the invention will now be shown. The method comprises the following steps:

Registering in the gateway switching centre GMSC of the incoming call from the calling subscriber A to the mobile subscriber MS.

Sending of a routing request message 24 from the gateway switch GMSC to the home location register HLR.

Fetching in the home location register HLR of a copy of the stored location information.

Sending of a location request message 25 from the home location register HLR, by using the fetched location information as an address to one of the switching centres, the so called addressed switching centre MSC/VLR1.

Sending of a location response message 26 from the addressed switching centre MSC/VLR1 to the home location register HLR, which message contains information about the present location of the mobile subscriber, i.e. the routing information to the switching centre MSC/VLR2 in which the mobile is present.

Sending of a location request response message 27, from the home location register HLR to the gateway switching centre GMSC, which message contains the routing information.

Figure 6:
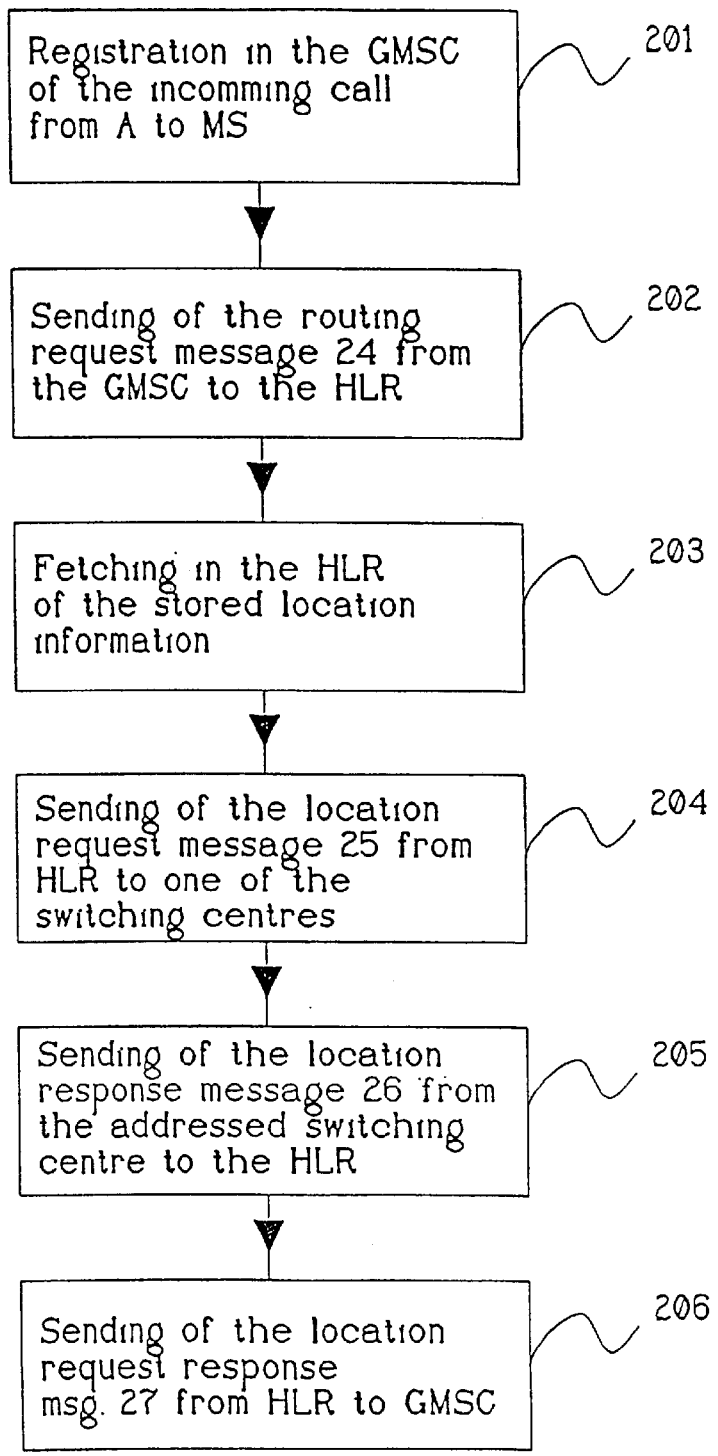
FIG. 6 is a flow sheet which illustrates the call routing procedure shown in FIG. 5.

FIG. 6 is a flow sheet illustrating the routing information request procedure according to the invention. The flow sheet illustrates the steps that are most essential to the concept behind the invention. The abbreviations in the text in FIG. 6 have been explained in the foregoing. The method is carried out in accordance with FIG. 6 and in accordance with the following steps:

Registering in the gateway switching centre GMSC of the incoming call from the calling subscriber A to the mobile subscriber MS, in accordance with a block 201.

Sending of the routing request message 24 from the gateway switch GMSC to the home location register HLR, in accordance with a block 202.

Fetching in the home location register HLR of the copy of the stored location information, in accordance with a block 203.

Sending of the location request message 25 from the home location register HLR, by using the fetched location information as an address to one of the switching centres, the so called addressed switching centre MSC/VLR1, in accordance with a block 204.

Sending of the location response message 26 from the addressed switching centre MSC/VLR1 to the home location register HLR, which message contains information about the present location of the mobile subscriber, i.e. the routing information to the switching centre MSC/VLR2 in which the mobile is present, in accordance with a block 205.

Sending of the location request response message 27, from the home location register HLR to the gateway switching centre GMSC, which message contains the routing information, in accordance with a block 206.

Figure 7:
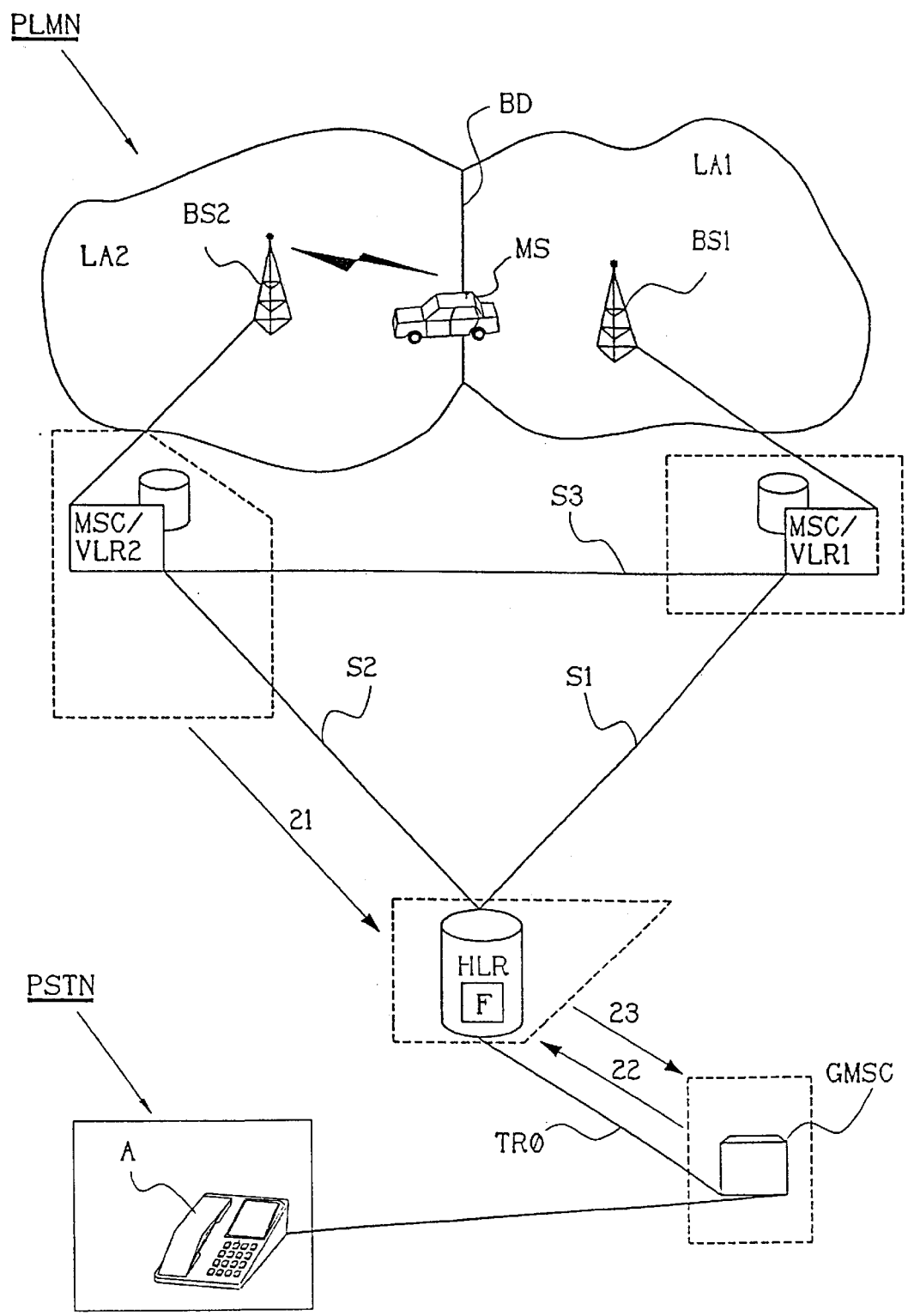
FIG. 7 is a block schematic diagram of a mobile network where second method of call routing according to the invention is illustrated.

FIG. 7 shows the same public land mobile network PLMN as earlier have been shown in FIG. 3 and 5. An alternative call set up procedure in accordance with the invention will in the following text be described. The home location register HLR comprises a flag F which indicates whether the location updating procedure is in progress or not. The flag F is set during the location updating procedure. A requirement for the call set up procedure is that the following steps have been (or will be) carried out during the location updating procedure:

sending of a flag set message 21 from the second switching centre MSC/VLR2 to the home location register HLR, after the earlier mentioned (see FIG. 3) location updating request message 1 has been sent from the mobile subscriber MS to the second switching centre MSC/VLR2. The flag set message 21 indicates that transferring of subscriber specific information is in progress.

Setting of the flag F in the home location register HLR.

Sending of the earlier mentioned (see FIG. 3) location information message 10.

Resetting of the flag F in the home location register HLR, indicating that no transferring of subscriber specific data is in progress. The resetting is done after the location information message 10 is received at the home location register from the second mobile services switching centre MSC/VLR2.

In the embodiment which now will be shown the call arrives to the gateway GMSC after the flag F has been set in the home location register HLR but before the flag F has been reset. The routing information request procedure according to the invention will now be shown. The method comprises the following steps:

Registering in the gateway switch GMSC of an incoming call from the calling subscriber A to the mobile subscriber MS.

Sending of a routing request message 22 from the gateway switch GMSC to the home location register HLR.

Establishing of the fact that the flag F is in state reset, indicating that no transferring of subscriber specific data is in progress. If the flag F is in state set, a wait mode will occur until the reset state is established.

Sending of a routing response message 23, from the home location register HLR to the gateway switch GMSC. The response message 23 contains a copy of the routing information to the mobile subscriber which is stored in the home location register HLR.

Figure 8:
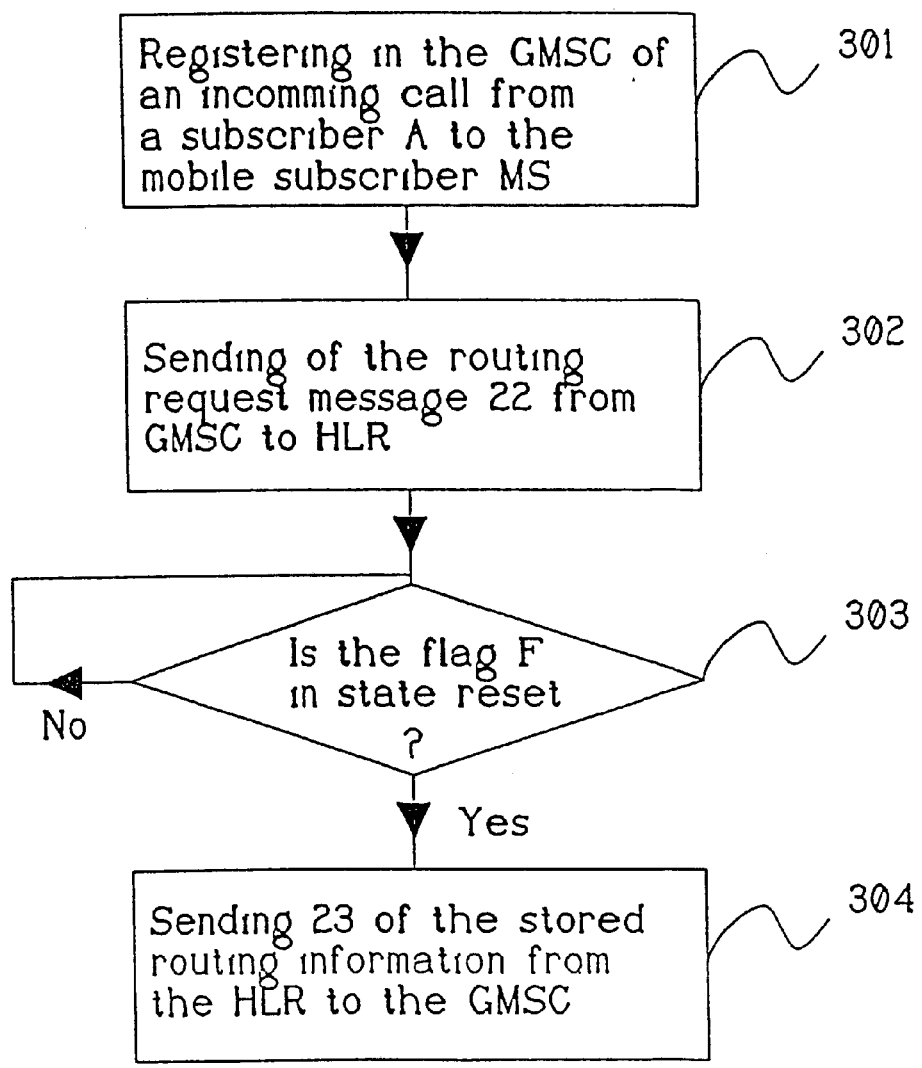
FIG. 8 is a flow sheet which illustrates the call routing procedure shown in FIG. 7.

FIG. 8 is a flow sheet illustrating the routing information request procedure, i.e. when the call arrives to the gateway GMSC after the flag F has been set and before the flag F has been reset. In according with the invention, tie flow. sheet illustrates the steps that are most essential to the concept behind the invention. The abbreviations in the text in FIG. 8 have been explained in the foregoing. The method is carried out in accordance with FIG. 8 and in accordance with the following steps:

Registering in the gateway switch GMSC of an incoming call from the calling subscriber A to the mobile subscriber MS, in accordance with a block 301.

Sending of the routing request message 22 from the gateway switch GMSC to the home location register HLR, in accordance with a block 302.

Establishing of the fact that the flag F is in state reset, indicating that no transferring of subscriber specific data is in progress. As long as the flag F is in state set, a wait mode will occur until the reset state is established, in accordance with a block 303.

Sending of a routing response message 23, from the home location register HLR to the gateway switch GMSC. The response message 23 contains a copy of the routing information to the mobile subscriber which is stored in the home location register HLR, in accordance with a block 304.

Figure 9:
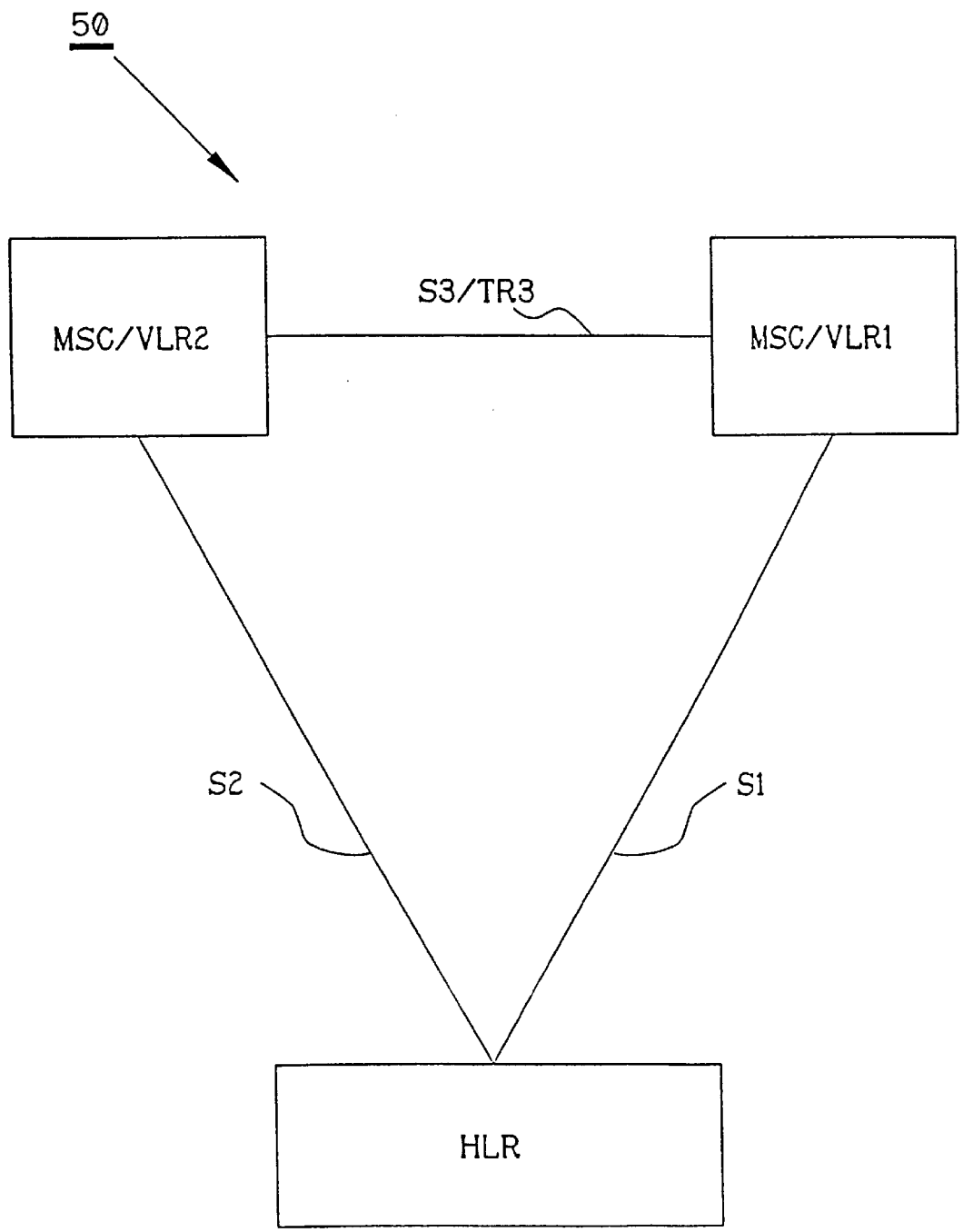
FIG. 9 is a block schematic illustration of an arrangement in accordance with the invention which is used when performing location updating and routing of calls.

In FIG. 9, relevant parts of the telecommunication system PLMN are shown, i.e. the constellation which in accordance with the invention, together forms the location updating arrangement 50. The location updating arrangement 50 comprises the home location register HLR, the first switching centre MSC/VLR1 and the second switching centre MSC/VLR2. The first switching centre MSC/VLR1 is connected to the home location register HLR via the first signalling trunk S1. The second switching centre MSC/VLR2 is connected to the home location register HLR via the second signalling trunk S2. The two switching centres MSC/VLR1 and MSC/VLR2 are connected to each other via the third signalling trunk S3 and the third traffic trunk TR3. The home location register HLR comprises a home send/receive arrangement for sending and receiving of messages to/from the first and second switching centres MSC/VLR1 and MSC/VLR2. The first switching centre MSC/VLR1 comprises a first send/receive arrangement for sending and receiving of messages to/from the home location register HLR and the second switching centre MSC/VLR2. The second switching centre MSC/VLR2 comprises a so called second send/receive arrangement for sending and receiving of messages to/from the home location register HLR and the first switching centre MSC/VLR1.

Although not explicitly shown it is to be understood that the invention may be used in various kinds of different mobile networks where a home location register acts as master. A few examples of different types of such systems are GSM, NMT, PDC and AMPS. As already have been said only the most relevant steps are mentioned in the methods above in an attempt to make the idea behind the invention more clear. The internal order between the different steps are also of minor importance for the invention and may vary without conflicting with the idea behind the invention. The location updating procedure in accordance with the invention may of course work in synergy with the traditional location updating procedure.

What is claimed is:

1. A method for transferring information related to a mobile subscriber which is moving within a cellular telecommunication system, wherein the system includes a first switching centre and a second switching centre, the first and second switching centres are connected to each other and to a home location register, the first and second switching centres each handle base stations having radio covering areas, the areas of the base stations of the first switching centre forming a first location area and the areas of the base stations of the second switching centre forming the second location area, whereby authentication data and subscriber data related to the mobile subscriber is permanently stored in the home location register and temporarily stored in the first switching centre in whose location area the mobile subscriber is present, said method comprising the steps of:

crossing, by the mobile subscriber, a boundary between the first location area and the second location area;

sending a location update request message, from the mobile subscriber to the second switching centre;

transferring the temporarily stored authentication data from the first switching centre to the second switching centre;

storing the authentication data in the second switching centre;

transferring data required to authenticate the mobile subscriber from the mobile subscriber to the second switching centre;

authorising the mobile subscriber as a visitor in the second switching centre;

transferring the temporarily stored subscriber data from the first switching centre to the second switching centre;

sending a location information message from the second switching centre to the home location register;

storing in the home location register the new location of the mobile subscriber;

sending a location information confirm message from the home location register to the second switching centre; and sending a location update confirm message from the second switching centre to the mobile subscriber.

2. A method for transferring information related to a mobile subscriber which is moving within a cellular telecommunication system, wherein the system includes a first switching centre and a second switching centre, the first and second switching centres are connected to each other and to a home location register, the first and second switching centres each handle base stations having radio covering areas, the areas of the base stations of the first switching centre forming a first location area and the areas of the base stations of the second switching centre forming the second location area, whereby authentication data and subscriber data related to the mobile subscriber is permanently stored in the home location register and temporarily stored in the first switching centre in whose location area the mobile subscriber is present, said method comprising the steps of:

crossing, by the mobile subscriber, a boundary between the first location area and the second location area;

sending a location update request message, from the mobile subscriber to the second switching centre;

sending an authentication data request message, from the second switching centre to the first switching centre;

sending an authentication data response message containing the temporarily stored authentication data, from the first switching centre to the second switching centre;

storing the authentication data in the second switching centre;

sending a triplet request message, from the second switching centre to the mobile subscriber;

sending a triplet response message, containing data required to authenticate the mobile subscriber, from the mobile subscriber to the second switching centre;

authorising the mobile subscriber as a visitor in the second switching centre;

sending a subscriber data request message, from the second switching centre to the first switching centre;

sending a subscriber data response message containing the temporarily stored subscriber data, from the first switching centre to the second switching centre;

sending a remove visitor request message from the second switching centre to the first switching centre;

removing the data in the first switching centre;

sending a remove visitor confirm message from the first switching centre to the second switching centre;

sending a location information message from the second switching centre to the home location register;

storing in the home location register the new location of the mobile subscriber;

sending a location information confirm message from the home location register to the second mobile services switching centre; and sending a location update confirm message from the second switching centre to the mobile subscriber.

3. A method for transferring information related to a mobile subscriber which is moving within a cellular telecommunication system, wherein the system includes a first switching centre and a second switching centre, the first and second switching centres are connected to each other and to a home location register, the first and second switching centres each handle base stations having radio covering areas, the areas of the base stations of the first switching centre forming a first location area and the areas of the base stations of the second switching centre forming the second location area, whereby subscriber specific data related to the mobile subscriber is permanently stored in the home location register and temporarily stored in the first switching centre in whose location area the mobile subscriber is present, said method comprising the steps of:

crossing, by the mobile subscriber, of a boundary between the first location area and the second location area;

sending a location update request message, from the mobile subscriber to the second switching centre;

transferring of the temporarily stored subscriber specific data from the first switching centre to the second switching centre;

sending a location information message from the second switching centre to the home location register;

storing in the home location register the new location of the mobile subscriber; and loading traffic information stored in the first or second switching centre into the home location register if the traffic information in the home location register is lost, wherein the system includes a gateway switch associated with a calling subscriber and with the home location register, said method further comprising the steps of:

registering in the gateway switch of an incoming call from the calling subscriber to the mobile subscriber;

sending a routing request message from the gateway switch to the home location register;

sending a location request message from the home location register, using the stored location information in the home location register as an address to a switching centre in whose location area the mobile subscriber is present;

sending a location response message from the switching centre in whose location area the mobile subscriber is present to the home location register , the location response message contains information about the present location of the mobile subscriber; and sending a location request response message, from the home location register to the gateway switch which message contains the routing information.

4. A method for transferring information related to a mobile subscriber which is moving within a cellular telecommunication system, wherein the system includes a first switching centre and a second switching centre, the first and second switching centres are connected to each other and to a home location register, the home location register comprises a flag indicating whether transferring of subscriber specific data is in progress, the first and second switching centres each handle base stations having radio covering areas, the areas of the base stations of the first switching centre forming a first location area and the areas of the base stations of the second switching centre forming a second location area, whereby the subscriber specific data related to the mobile subscriber is permanently stored in the home location register and temporarily stored in the first switching centre in whose location area the mobile subscriber is present, said method comprising the steps of:

crossing, by the mobile subscriber, a boundary between the first location area and the second location area;

sending a location update request message, from the mobile subscriber to the second switching centre;

sending a flag set message from the second switching centre to the home location register, the flag set message indicates that transferring of subscriber specific data is in progress;

setting the flag in the home location register;

transferring the temporarily stored subscriber specific data from the first switching centre to the second switching centre;

sending a location information message from the second switching centre to the home location register;

storing in the home location register the new location of the mobile subscriber; and resetting the flag in the home location register thereby indicating that no transferring of subscriber specific data is in progress.

5. A method for transferring information related to a mobile subscriber which is moving within a cellular telecommunication system, wherein the system includes a first switching centre and a second switching centre, the first and second switching centres are connected to each other and to a home location register, the home location register comprises a flag indicating whether transferring of authentication data and subscriber data is in progress, the first and second switching centres each handle base stations having radio covering areas, the areas of the base stations of the first switching centre forming a first location area and the areas of the base stations of the second switching centre forming a second location area, whereby the authentication data and subscriber data related to the mobile subscriber is permanently stored in the home location register and temporarily stored in the first switching centre in whose location area the mobile subscriber is present, said method comprising the steps of:

crossing, by the mobile subscriber, a boundary between the first location area and the second location area;

sending a location update request message from the mobile subscriber to the second switching centre;

sending a flag set message from the second switching centre to the home location register, the flag set message indicates that transferring of subscriber specific data is in progress;

setting the flag in the home location register;

transferring the temporarily stored authentication data from the first switching centre to the second switching centre;

storing the authentication data in the second switching centre;

transferring data required to authenticate the mobile subscriber from the mobile subscriber to the second switching centre;

authorising the mobile subscriber as a visitor in the second switching centre;

transferring the temporarily stored subscriber data from the first switching centre to the second switching centre;

sending a location information message from the second switching centre to the home location register;

storing in the home location register the new location of the mobile subscriber;

sending a location information confirm message from the home location register to the second switching centre;

resetting the flag in the home location register, indicating that no transferring of subscriber specific data is in progress; and sending a location update confirm message from the second switching centre to the mobile subscriber.

6. A method for transferring information related to a mobile subscriber which is moving within a cellular telecommunication system, wherein the system includes a first switching centre and a second switching centre, the first and second switching centres are connected to each other and to a home location register, the home location register comprises a flag indicating whether transferring of authentication data and subscriber data is in progress, the first and second switching centres each handle base stations having radio covering areas, the areas of the base stations of the first switching centre forming a first location area and the areas of the base stations of the second switching centre forming a second location area, whereby the authentication data and the subscriber data related to the mobile subscriber is permanently stored in the home location register and temporarily stored in the first switching centre in whose location area the mobile subscriber is present, said method comprising the steps of:

crossing, by the mobile subscriber, a boundary between the first location area and the second location area;

sending a location update request message, from the mobile subscriber to the second switching centre;

sending a flag set message from the second switching centre to the home location register, the flag set message indicates that transferring of subscriber specific data is in progress;

setting the flag in the home location register;

sending an authentication data request message from the second switching centre to the first switching centre;

sending an authentication data response message containing the temporarily stored authentication data from the first switching centre to the second switching centre;

storing the authentication data in the second switching centre;

sending a triplet request message, from the second switching centre to the mobile subscriber;

sending a triplet response message, containing data required to authenticate the mobile subscriber, from the mobile subscriber to the second switching centre;

authorising the mobile subscriber as a visitor in the second switching centre;

sending a subscriber data request message, from the second switching centre to the first switching centre;

sending a subscriber data response message containing the temporarily stored subscriber data, from the first switching centre to the second switching centre;

sending a remove visitor request message from the second switching centre to the first switching centre;

removing the data in the first switching centre;

sending a remove visitor confirm message from the first switching centre to the second switching centre;

sending a location information message from the second switching centre to the home location register;

storing in the home location register the new location of the mobile subscriber;

sending a location information confirm message from the home location register to the second switching centre;

resetting the flag in the home location register, thereby indicating that no transferring of subscriber specific data is in progress; and sending a location update confirm message from the second switching centre to the mobile subscriber.

7. The method of claim 4, wherein the system includes a gateway switch associated with a calling subscriber and with the home location register, said method further comprising the steps of:

registering in the gateway switch an incoming call from the calling subscriber to the mobile subscriber;

sending a routing request message from the gateway switch to the home location register;

establishing that the flag is in reset state, thereby indicating that no transferring of subscriber specific data is in progress; and sending a routing response message, from the home location register to the gateway switch, the routing response message contains the routing information to the mobile subscriber which is stored in the home location register.

8. A method for transferring information related to a mobile subscriber which is moving within a cellular telecommunication system, wherein the system includes a first switching centre and a second switching centre, the first and second switching centres are connected to each other and to a home location register, the first and second switching centres each handle base stations having radio covering areas, the areas of the base stations of the first switching centre forming a first location area and the areas of the base stations of the second switching centre forming the second location area, whereby subscriber specific data related to the mobile subscriber is permanently stored in the home location register and temporarily stored in the first switching centre in whose location area the mobile subscriber is present, said method comprising the steps of:

crossing, by the mobile subscriber, of a boundary between the first location area and the second location area;

sending a location update request message, from the mobile subscriber to the second switching centre;

transferring of the temporarily stored subscriber specific data from the first switching centre to the second switching centre;

sending a location information message from the second switching centre to the home location register;

storing in the home location register the new location of the mobile subscriber; and loading traffic information stored in the first or second switching centre into the home location register if the traffic information in the home location register is lost, wherein:

a most appropriate path for transferring information between two signalling nodes in the system is set up;

traffic path's are used for transferring information between the signalling nodes; and the signalling is integrated with the traffic path's by use of multidrop technique.

9. A location updating arrangement for transferring information related to a mobile subscriber which is moving within a cellular telecommunication system, the arrangement comprising:

a home location register connected to a first switching centre via a first trunk the home location register also is connected to a second switching centre, via a second trunk, the first and second switching centres are connected to each other via a third trunk;

an arrangement in the first switching centre for transferring subscriber specific data to the second switching centre;

an arrangement in the second switching centre for transferring the subscriber specific data from the first switching centre;

an arrangement in the second switching centre for sending location information to the home location register;

an arrangement in the home location register for receiving of the location information from the second switching centre, wherein the home location register comprises a flag;

an arrangement in the second switching centre for sending a flag set message to the home location register; and an arrangement in the home location register for receiving the flag set message from the second switching centre.

* * * * *